_United States Patent_ [19]

Birk

[11] Patent Number: 5,510,905
[45] Date of Patent: Apr. 23, 1996

[54] VIDEO STORAGE SERVER USING TRACK-PAIRING

[76] Inventor: Yitzhak Birk, 3350 Thomas Dr., Palo Alto, Calif. 94303

[21] Appl. No.: 128,418

[22] Filed: Sep. 28, 1993

[51] Int. Cl.⁶ .................................................. H04N 5/76
[52] U.S. Cl. ................................................... 358/342
[58] Field of Search ................................ 358/711, 335, 358/342, 310; 360/32, 33.1

[56] References Cited

U.S. PATENT DOCUMENTS

| | | | |
|---|---|---|---|
| 4,205,339 | 5/1980 | Howe | 179/100.1 |
| 4,858,025 | 8/1989 | Tabei | 358/310 |
| 5,067,031 | 11/1991 | Yamasaki et al. | 360/22 |
| 5,087,992 | 2/1992 | Dahandeh et al. | 360/31 |
| 5,202,799 | 4/1993 | Hetzler et al. | 360/48 |
| 5,224,217 | 6/1993 | Zangenehpour | 395/425 |
| 5,257,143 | 10/1993 | Zangenehpour | 360/48 |
| 5,260,801 | 11/1993 | Temma et al. | 358/335 |
| 5,301,297 | 4/1994 | Menon et al. | 395/425 |

FOREIGN PATENT DOCUMENTS

1273384  7/1988  Japan ........................... G11B 17/007

_Primary Examiner_—Tommy P. Chin
_Assistant Examiner_—Robert Chevalier

[57] ABSTRACT

A track-pairing technique for use in recording and retrieving video data by alternating between a pair of tracks when recording and retrieving data segments of a data stream, a video server or recording disk is able to take advantage of zone bit recording when recording, yet data transfer rate upon retrieval is independent of track location. As a result, guaranteed throughput is substantially improved and the number of data streams which can be simultaneously sourced increases. The track-pairing technique can be embodied in a video server, a recording disk, a data layout method, or a data retrieval method.

20 Claims, 7 Drawing Sheets

DATA CHUNK FOR VIDEO TITLE A

FIG. 4A

DATA CHUNK FOR VIDEO TITLE B

VIDEO STORAGE SERVER USING TRACK-PAIRING

BACKGROUND OF THE INVENTION

1. Field of the Invention

The present invention relates to a video-on-demand storage server and, more particularly, to a method and apparatus for optimizing data retrieval performance in disk drives exploiting zone bit recording.

2. Description of the Related Art

Currently, video tapes may be rented at video rental stores. Typically, the video tapes are rented for one to three nights at a time. The subject matter of the available tapes include movies, entertainment games, and the like.

There are certain disadvantages in renting video tapes from video rental stores. First, the selection of movies at each video rental store is limited. Second, the number of rentable copies of each particular video tape is also limited. As a result, all the people seeking to rent a recently released popular movie will not be able to rent a video tape containing a copy of the movie. Hence, the availability of the video tapes cannot be guaranteed. Third, the people renting video tapes are required to go to the video rental store to select and rent a video tape, view the tape, and then return to the video rental store to return the tape. It is time consuming and typically inconvenient for the user to frequent the video store twice in order to view a video tape.

Lately, video-on-demand (VOD) systems have received a lot of attention because of their ability to solve these problems. In general, a VOD system would include a central storage server having numerous videos stored in digital form, a controller, a communication network, and customer equipment boxes. A customer would select an available movie (i.e., movie stored in the storage server) using the customer's equipment box. The controller would then transmit the selected movie over the communication network to the customer's equipment box. The customer then views the movie on his/her television without ever having to enter a video rental store.

Although file servers exist for applications such as on-line transaction processing, the architecture of the file servers is not well suited to VOD applications. As an example, on-line transaction processing tends to transfer numerous unrelated small pieces of data whose identities are disclosed only when urgently needed, whereas VOD servers are required to concurrently provide a large number of smooth streams of data. The rate of each stream is currently several times lower than the sustained transfer rate of a single magnetic disk drive. For example, a typical stream rate is between 1.5 and 6 Megabits per second, whereas the sustained transfer rate of a modern disk is between 15 and 30 Megabits per second.

There are also problems associated with existing VOD systems. In order to cost-effectively meet customer demand, video storage servers are required to provide a large number of current streams of data. Each storage server consists of one or more magnetic disk drives. These magnetic disk drives must be able to retrieve the data such that the streams of data can be smoothly transmitted at an appropriate speed for customer viewing. Because of the heavy demands placed on storage servers, there is a need for optimization of storage servers. In particular, there is a need to increase the number of streams that can be concurrently sourced by a storage server.

Classically, data is stored on magnetic disks such that the data transfer rate is independent of the track number. The number of streams that such disks can serve is largely independent of the reading location on the disks. This classical recording approach, however, does not make efficient use of magnetic disk recording area because the data transfer rate and rotation rate are fixed. As a result, the recording density is fixed by the inner most track. Hence, recording density is wasted in all other tracks having a larger circumference.

By using zone bit recording, the amount of data stored to a magnetic disk can be increased. That is, the recording density wasted is substantially reduced as compared with the classical case.

Zone bit recording is an approximation to fixed linear recording density. More particularly, with zone bit recording, a recording surface is divided into a sequence of concentric zones, and the number of sectors per track in any given zone is equal to the number that fit into the innermost track of that zone at the highest possible linear recording density. As an example, a disk might have between 7 and 15 zones.

A problem with using zone bit recording on a magnetic disk with a fixed rotation rate is that the transfer rate will vary considerably (almost by a factor of 2) with track location. As a result, even if access time can be neglected altogether, the number of streams that can be concurrently sourced depends strongly on the reading location. This problem does not occur in magnetic disk drives not employing zone bit recording. The problem also does not occur in compact disks because data, although recorded at a constant linear density, is read at a constant data transfer rate by varying the rotation speed.

Although one exploitation of zone bit recording would be to place more frequently viewed material in the outermost tracks, this simplistic approach is problematic because the frequency of viewing usage varies with time. Hence, constant rearrangement of data would be necessary. Such rearrangement of data is a task that not only burdens the video server but is otherwise not well understood.

Thus, there is a need for a video storage server that uses zone bit recording on its magnetic disks, yet achieves a substantially constant data transfer rate.

SUMMARY OF THE INVENTION

Generally speaking, the invention relates to a track-pairing technique that exploits zone bit recording, and yet yields a substantially constant data transfer rate independent of track position.

As an apparatus, the invention can be embodied as a video storage server, a disk drive, or a recording disk.

A video storage server according to an embodiment of the invention stores video data for a plurality of video titles, and includes a magnetic disk drive. The magnetic disk drive stores video data for the plurality of video titles in a zone bit recording format. The video data stored or recorded for each of the video titles includes successive data segments that are alternately recorded in two different tracks which form a track-pair. The granularity of alternation may be finer or coarser than one track, so long as the angles swept by the rotating disk to read the two members of a pair are equal.

A recording disk according to an embodiment of the invention stores video information for later retrieval. The recording disk includes a plurality of tracks on which the video information for one or more video titles is recorded in a zone bit recording format. Each video title is stored as contiguous data alternately over a pair of tracks. The pair of tracks includes a first track and a second track, when the first track is TR1, then the second track is TR2=N−TR1+1, where the tracks are numbered 1, 2, ..., N, and N is the number of tracks on the recording disk being paired. Further, it may be beneficial to exclude some of the tracks from the track-pairing technique, or to form multiple pairs of contiguous track ranges whose tracks are paired.

As a method, the invention can be embodied as a method for storing a stream of video data to a storage system so as to obtain a nearly constant data transfer rate when reading the video data from the storage system. According to the method, the data associated with a certain video title is partitioned into data segments. Next, two different tracks of the storage system are identified. Thereafter, the data segments are recorded to the two different tracks of the storage system using zone bit recording by alternating between the two different tracks. The invention can also be embodied as a method for retrieving the stored video data by alternately reading from the two different tracks of the storage system.

By using an inventive track-pairing scheme, not only is the zone bit recording exploited, but the transfer time for reading the video data from the disks is constant over time, regardless of which track the data is read from. Because disk performance is independent of where on the disk it is read, worst-case disk performance can be improved. Consequently, the number of data streams a video storage server can guarantee is maximized.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–8. However, those skilled in the art will readily appreciate that the detailed description given herein with respect to these figures is for explanatory purposes as the invention extends beyond these limited embodiments.

Figure 1:
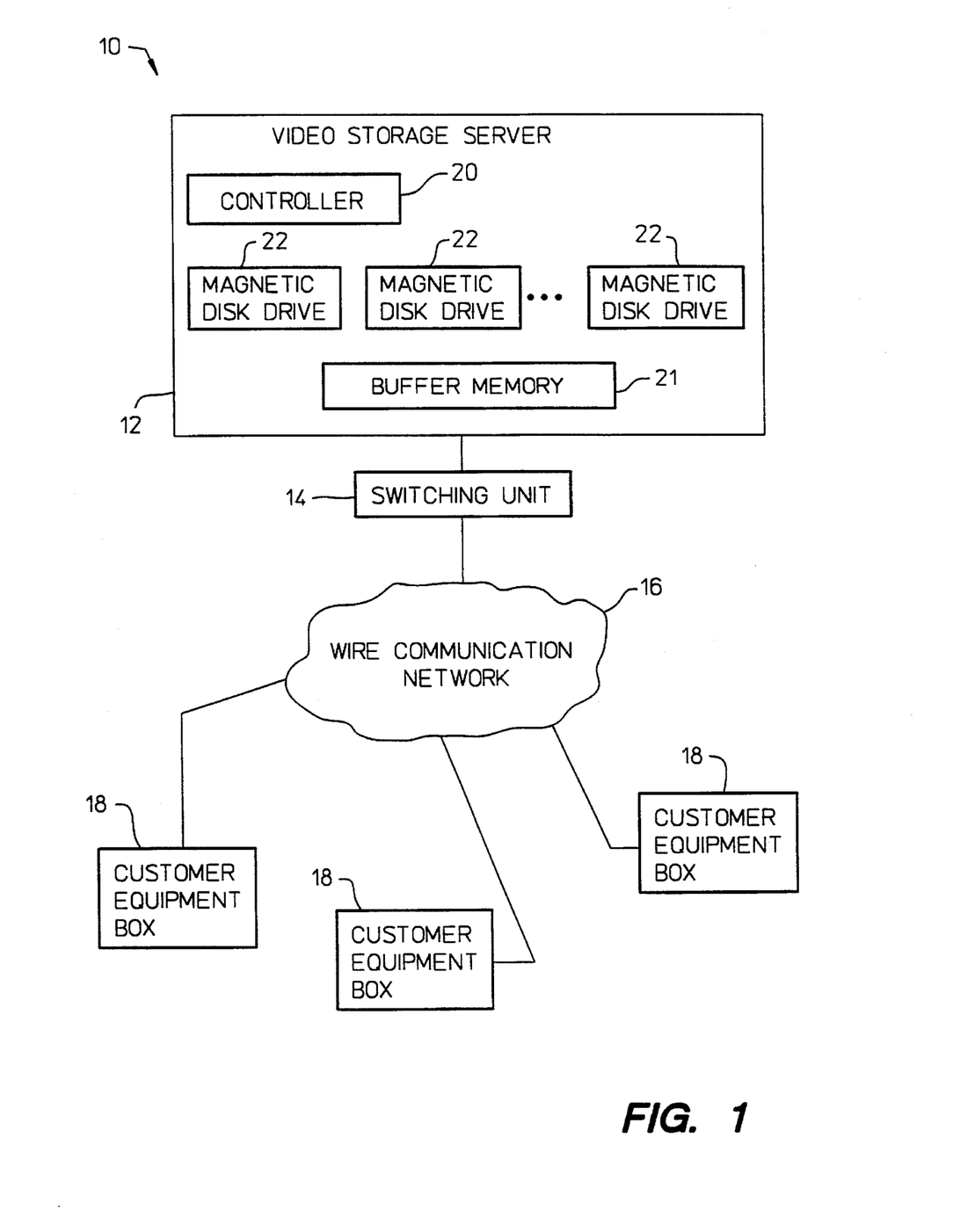
FIG. 1 is a block diagram of a video-on-demand system according to the invention.

FIG. 1 is a block diagram of a video-on-demand (VOD) system according to the invention. The VOD system 10 includes a video storage server 12, a switching unit 14, a wired communication network 16 and customer equipment boxes 18. The video storage server 12 includes a controller 20, a buffer memory 21, and several magnetic disk drives 22. The disk drives 22 store video data for numerous video titles (e.g., movie titles). The controller 20 controls the reading and writing of data to the disk drives 22. Video data which is read from the disk drives 22 is output from the storage server 12 to the communication network 16 via the switching unit 14. The video data is then received by certain customers who use their customer equipment box 18 to select the channel broadcasting the video they desire to view. Since the invention pertains to the storage and retrieval of data from the disk drives 22 of the storage server 12, the remaining detailed description will not discuss the details of the other elements of the VOD system 10 which are known in the art.

The objective of the VOD system 10 is to provide each customer with the video data desired. Video data is read from the disks 22 to produce data streams which are transmitted to customers for viewing. The data streams are actually sequences of discrete chunks of data (data chunks) which are periodically transmitted in bursts so that over time a constant stream of data is transmitted. A sequence of bursts, typically one data chunk per active video stream, is referred to as a schedule round. The data stream is smoothed out using the buffer memory 21. Typically, each burst of video data corresponds to about 0.5 to 1.0 second of a video title for each magnetic disk drive 22.

The objective of the invention is to maximize worst-case disk performance, namely the amount of data that can be read per unit time with the least favorable choice of video titles to be viewed. This is achieved by making disk performance effectively independent of where on the disk it is read. To obtain performance independent of reading location, the effective disk transfer rate must be independent of the reading location (e.g., track). However, using zone bit recording intentionally (to increase disk storage) makes the disk transfer rate vary with the reading location.

By using an inventive track-pairing scheme, effective disk transfer rate becomes independent of the reading location even though zone bit recording is used. According to the invention, the inventive track-pairing scheme divides the data chunk to be read for any given data stream in a single schedule round into two portions, and then places each portion on a different track such that the total transfer time depends on the amount of data to be read but not on its location on the disk. Alternatively, in a VOD system with multiple disk drives, the inventive track-pairing scheme can place the data read for any given stream in a single schedule round on different tracks by alternating between a first track on a first disk drive and a second track on a second disk drive. The inventive track-pairing scheme is described below for a single disk drive arrangement as well as for an arrangement with multiple disk drives in a disk array.

In the single disk drive arrangement, each schedule round requires two disk accesses for each data stream, one access to each of the different tracks being paired together. Although the access time for each access is equal according to the invention, different amounts of data are obtained because of zone bit recording. However, jointly the two accesses return a fixed amount of data in a fixed amount of time, irrespective of the track locations. It should be recognized that the two accesses for a given pair of tracks need not be in immediate time succession and may be separated by accesses on behalf of other streams.

Figure 2:
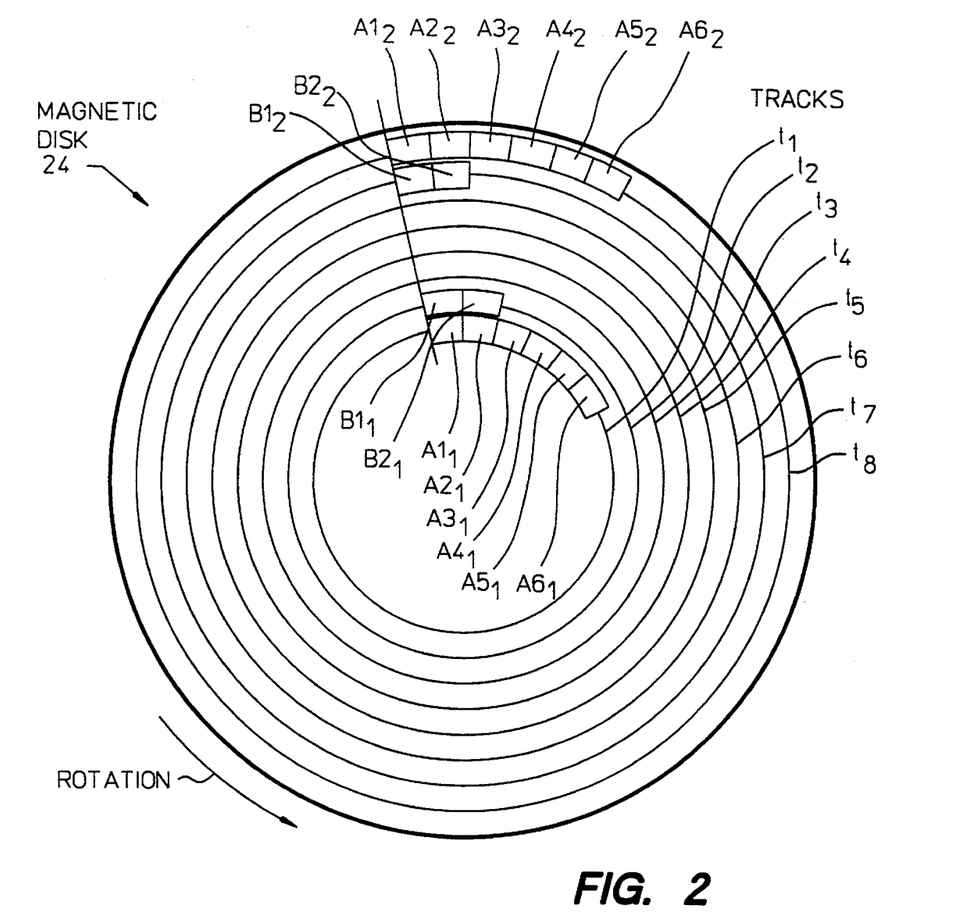
FIG. 2 is a diagram of a perspective view of a magnetic disk utilizing track-pairing.

FIG. 2 is a diagram of a perspective view of a magnetic disk. Although normally such magnetic disks 24 actually contain about 2000 tracks on each of some 10–20 recording surfaces, for illustration purposes, the magnetic disk 24 is illustrated as having eight tracks $t_1$-$t_8$ on a single recording surface and an outer physical boundary 26. With respect to zone bit recording, it is also assumed that each track $t_1$-$t_8$ is in a separate zone, although normally multiple tracks would be included with each zone. In FIG. 2, the track-pairing for a few schedule rounds for two different video titles A and B is illustrated. A data chunk is recorded each schedule round.

Conventionally, data for video title A would be placed on a track as a contiguous stream. Such a conventional, contiguous stream could be represented as follows

| A1 | A2 | A3 | A4 | A5 | A6 |
|----|----|----|----|----|----|

The inventive track-pairing scheme of the invention operates differently. Each schedule round a data chunk (A1, A2 ...) for video title A is first divided into two portions. Each portion is then stored to a different track. As shown in FIG. 2, a first portion of chunk $A1_1$ is recorded on track $t_1$, while a second part of chunk $A1_2$ is recorded to track $t_8$. The time required to read each of the portions is the same, but the amount of data varies. The outer most tracks store more data than inner tracks having smaller radii.

Figure 3:
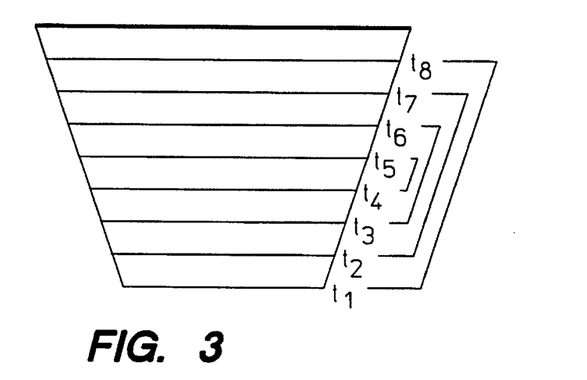
FIG. 3 is a schematic diagram illustrating the amount of data each track stores using zone bit recording.
Figure 4A:
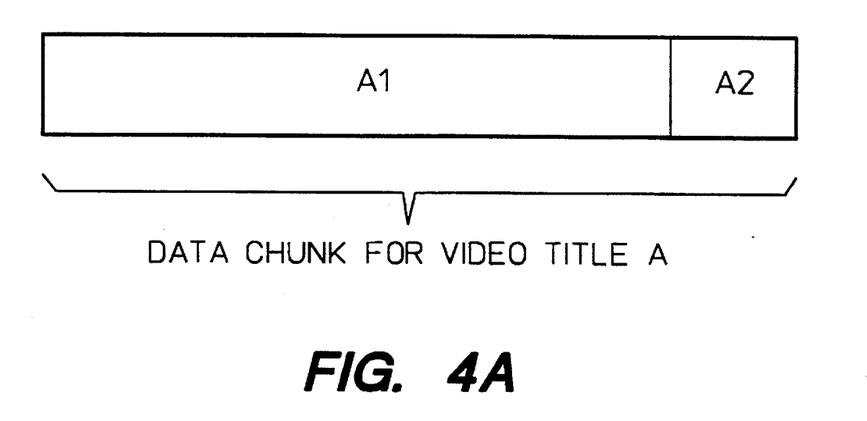
FIGS. 4A and 4B are schematic diagrams illustrating partitioning of a data chunk into unequal portions.
Figure 4B:
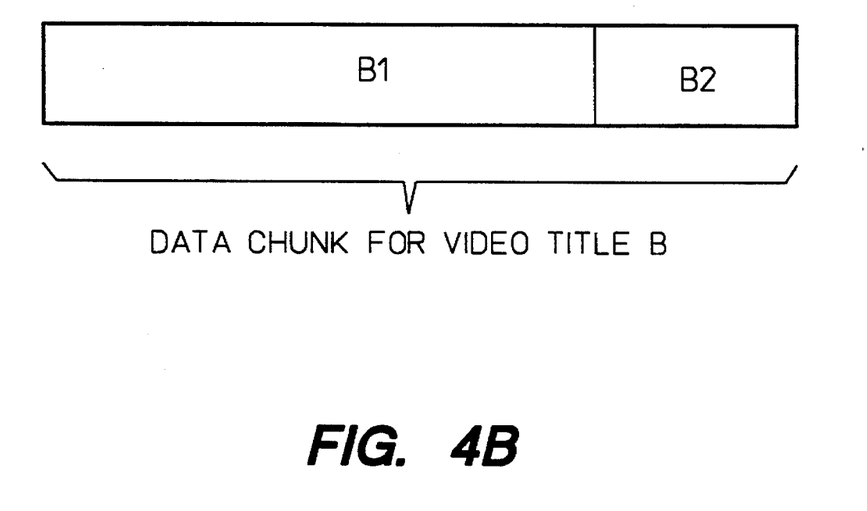

Although track-pairing stores the same amount of data as conventionally done, two different tracks are used to store the data. FIG. 3 is a schematic diagram illustrating the amount of data each track stores for a given chunk. Of the two tracks being paired together, the outer track will store more information because zone bit recording is being utilized. Nevertheless, although two tracks are used, a complete data chunk is read for each schedule round regardless of which track-pair is used. FIGS. 4A and 4B are schematic diagrams illustrating this point. In particular, a smaller portion is placed on the inner track of the track-pair and a larger portion is placed on the outer track of the track pair.

In general, if a first of the tracks is r, the second of the tracks is N−r+1, where N is the total number of tracks being paired. FIG. 3 also illustrates the pairing of tracks in the simplified eight track magnetic disk 24 shown in FIG. 2. In particular, tracks $t_1$ and $t_8$ are paired, tracks $t_2$ and $t_7$ are paired, tracks $t_3$ and $t_6$ are paired, and tracks $t_1$ and $t_5$ are paired. The quantity of data storable in each track differs from its neighboring track by an essentially constant amount. Therefore, the quantity of data storable in any given pair of tracks is essentially constant, even for the entire disk.

The advantage provided by the invention is that the transfer rate of each chunk of data is now independent of the track locations. As a result, guaranteed throughput of a disk drive is approximately 40% greater than that conventionally available. Buffering requirements are also reduced by a factor of about 0.6 as compared with the conventional approach.

Track-pairing does, however, double the overhead because two accesses are required, instead of the conventional single access. In any case, the two accesses need not occur in immediate time succession. Conventionally, a seek-efficient arm-scheduling algorithm for reading several locations on a disk in a fixed round-robin order uses a unidirectional elevator algorithm to schedule the order of track accessing. Normally, this conventional algorithm begins granting access requests at the innermost track and proceeds outward to the outermost track. Upon reaching the outermost track, the arm jumps back to the innermost track and repeats.

With track-pairing, the order of data accesses for the second portions is the reverse of that of the first portions. Thus, use of a bidirectional elevator seek algorithm partially offsets this overhead penalty. The bidirectional algorithm would operate just as the conventional unidirectional algorithm, but instead of jumping back to the innermost track upon reaching the outermost track, the bidirectional algorithm would simply reverse direction and operate the arm to scan back from the outermost to the innermost track reading the requested streams as it goes.

For example, consider a 20-track disk storing three movies. The movies could be placed on the disk as follows:

Movie #1: on track pairs (1, 20), (2, 19), (3, 18) and (4, 17);

Movie #2: on track pairs (5, 16), (6, 15) and (7, 14);

Movie #3: on track pairs (8, 13), (9, 12) and (10, 11)

If all the movies are started together and read in order, the track access sequence would be: $t_1$, $t_5$, $t_8$; $t_{20}$, $t_{16}$, $t_{13}$; $t_2$, $t_6$, $t_9$; $t_{19}$, $t_{15}$, $t_{12}$; etc., with ";" indicating a reversal in sweeping direction. Alternatively, if the movies were started at different times, a contiguous sequence of accesses could be: $t_1$, $t_8$, $t_{16}$; $t_{20}$, $t_{13}$, $t_6$; $t_2$, $t_9$, $t_{15}$; etc. Note that this later example illustrates that an arm scan in any single direction (outward or inward) may read an "inner" member of a track pair for some movies and an "outer" member for other movies. Hence, the bidirectional algorithm enables the requested data streams to be read efficiently and in the proper order.

An alternative approach to the use of track-pairing is to place the data such that each access lasts as long as the single access of the conventional system. This alternative approach can be carried out by doubling the chunk size (as compared with a conventional system) prior to partitioning chunks between a pair of tracks. The total transfer time of each chunk remains fixed. As in the original approach, the average disk transfer rate remains independent of track location. The access overhead is the same as for a conventional scheme. However, the amount of buffering required increases by a factor of 1.3 in comparison to the conventional approach.

Although a single disk drive is used herein as having a single magnetic recording surface, in actuality, the disk drive contains several recording surfaces which form a cylinder. The multiple recording surfaces increase the storage density of a single disk drive but function the same as if there is a single magnetic recording surface. The magnetic disk 24 is representative of either a single magnetic surface or a cylinder of such magnetic surfaces accessed in lock-step.

Due to the great amounts of data that video servers need to store, they typically contain many magnetic disk drives. To balance the load throughout the drives, the video data is normally striped across the array of disk drives. For example, a first disk drive would have a first schedule round for a video title stored in a first track, a second disk drive would have a second schedule round for the video title, and so on until all the drives have been accessed and then the cycle repeats. Within the disk array, the track-pairing can be intra-drive or inter-drive.

In an intra-drive track-pairing setup, tracks are paired within each drive in the disk array. For example, using the alternative approach to track-pairing, the first data chunk for a given stream is on an outer track of the first drive, the next data chunk is on an inner track of that drive, and the next two chunks are on the second drive, and so on. The two data chunks on each drive can be read in immediate succession, or with additional buffering, the server can allow the controller to optimize the schedule for performance. The original approach can also be used.

In an inter-drive track-pairing setup, tracks are paired, not in one drive, but in pairs of disk drives. The data chunks in a data stream are divided into unequal portions and then placed on the pair of disk drives. For example, the large portion of a first data chunk would go to an outer track of a first disk drive, the small portion of the first data chunk would go to an inner track of a second disk drive, the large portion of the second chunk would go to an outer track of a third disk drive. With an even number of disk drives, any given title would occupy outer tracks on even-numbered disk drives and inner tracks on odd-numbered disk drives, or vice versa. With an odd number of disk drives, each title would alternate between these two options, thereby balancing the use of the drives.

Scheduling in the inter-drive track-pairing situation can be efficiently performed. When there are an even number of disk drives, a given video title occupies a single contiguous area on any given drive. The video title will occupy the same tracks on the even-numbered drives and the same tracks for the odd-numbered drives. Therefore, the track order of active streams on consecutive drives is reversed. Hence, an efficient arm-scheduling policy that results in a fixed reading order for all streams would be to use a unidirectional elevator algorithm in one direction for odd-numbered drives, and for even-numbered drives execute the algorithm in the opposite direction. If, on the other hand, there is an odd number of drives, a given video title occupies two contiguous regions on any given drive. The track order in which the active streams need to be accessed keeps reversing itself. Thus, each drive should use a bidirectional elevator algorithm to access each stream once in each direction.

Although the apparatus described above and illustrated in FIGS. 1 and 2 embodies the invention, the invention is also embodied in a method. FIGS. 5–8 are flow charts that illustrate the method according to the invention.

Figure 5:
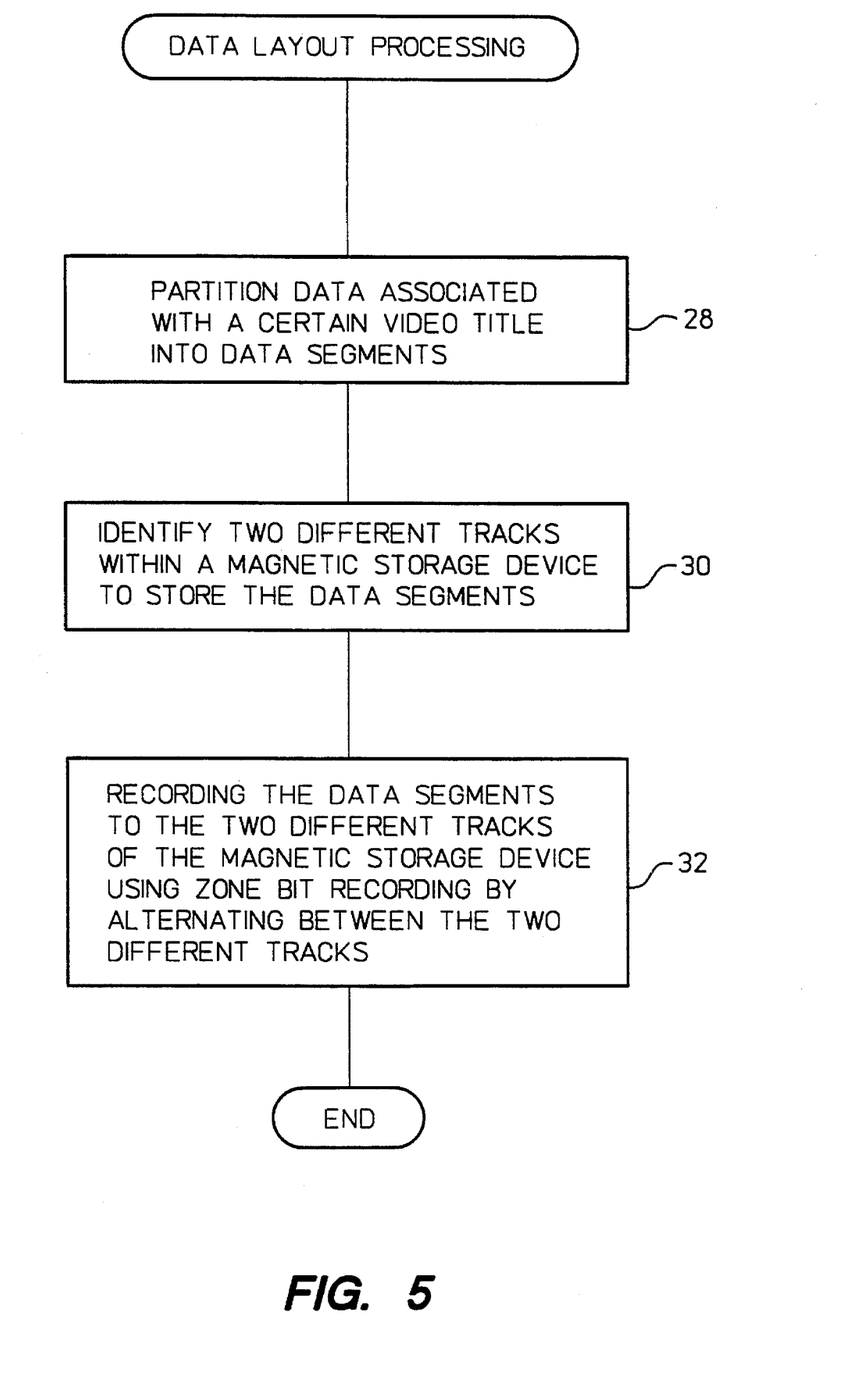
FIGS. 5 and 6 are flow charts illustrating data layout processing and data retrieval processing according to a basic embodiment of a method according to the invention.
Figure 6:
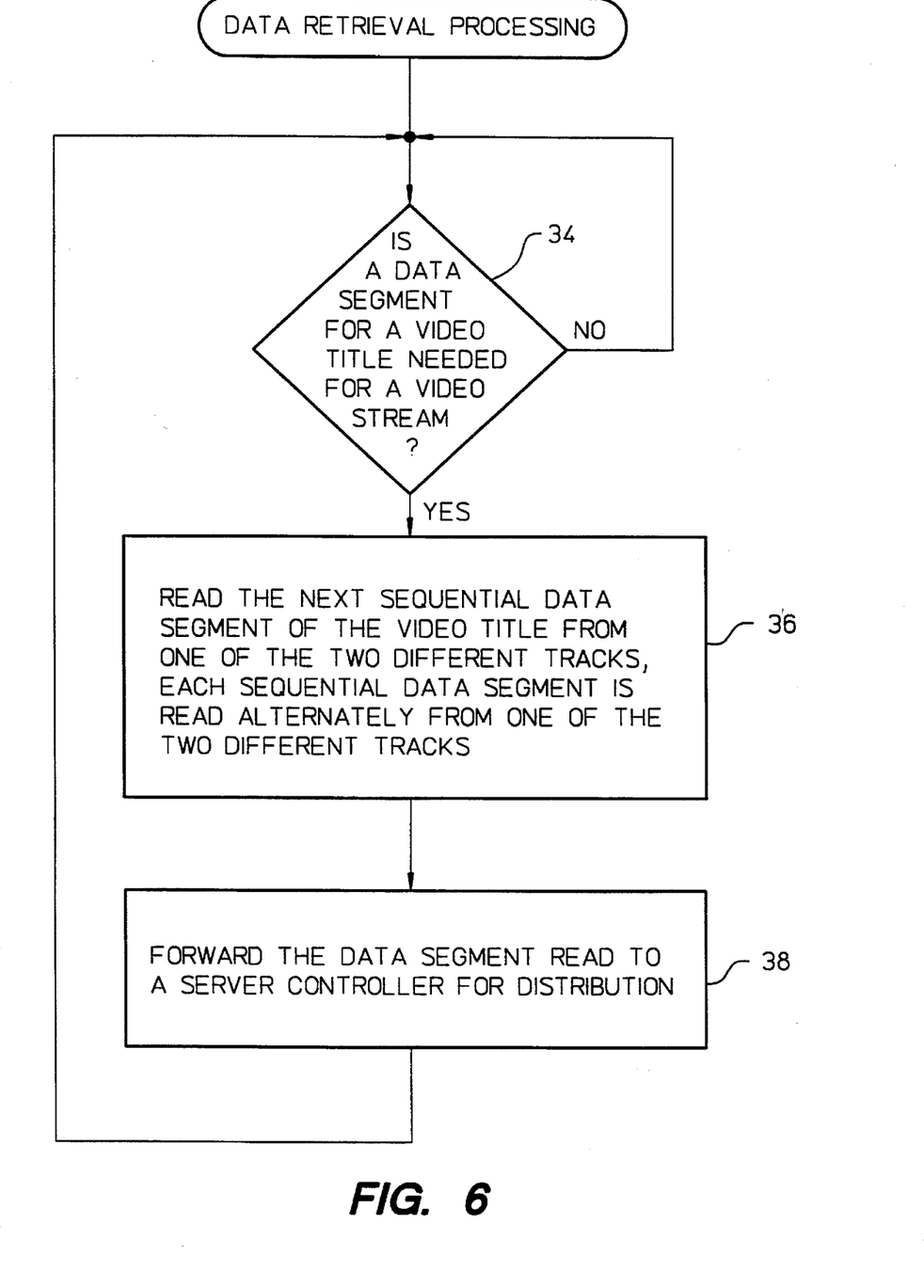

A basic embodiment of a method according to the invention is illustrated in FIGS. 5 and 6. The basic embodiment of the method includes data layout processing (FIG. 5) and data retrieval processing (FIG. 6).

The data layout processing (FIG. 5) begins by partitioning 28 data which is associated with a certain video title into data segments. The data segments may be of equal or unequal size. Next, two different tracks within a magnetic storage device are identified 30 for storage of the data segments. The two different tracks form a track-pair as discussed above. The tracks can be on a single magnetic disk drive or on different magnetic disk drives of a storage server. Thereafter, the data segments are recorded 32 to the two different tracks of the magnetic storage device using zone bit recording by alternating between the two different tracks. As discussed above, the data layout processing facilitates the retrieval of the data with an average disk transfer rate that is independent of track position.

The data retrieval processing (FIG. 6) begins with a decision 34 based on whether a data segment for a video title is needed for an active video stream. If a data segment is not needed, then the retrieval processing waits until a data segment is needed. However, when a data segment is needed, the retrieval processing proceeds to read 36 the next sequential data segment of the video title from one of the two different tracks. Each data segment is read alternately from one of the two different tracks. That is, if the previous data segment was read from a first of the two different tracks, the current data segment is read from the other of the two different tracks. The data segments may be equal or unequal in size. When unequal in size, their size is proportional to the circumference of the track position where they are recorded. Further, the two different tracks can be within a single disk drive or within a pair of disk drives. In any case, the data segment read is forwarded 38 to a server controller for distribution.

Figure 7:
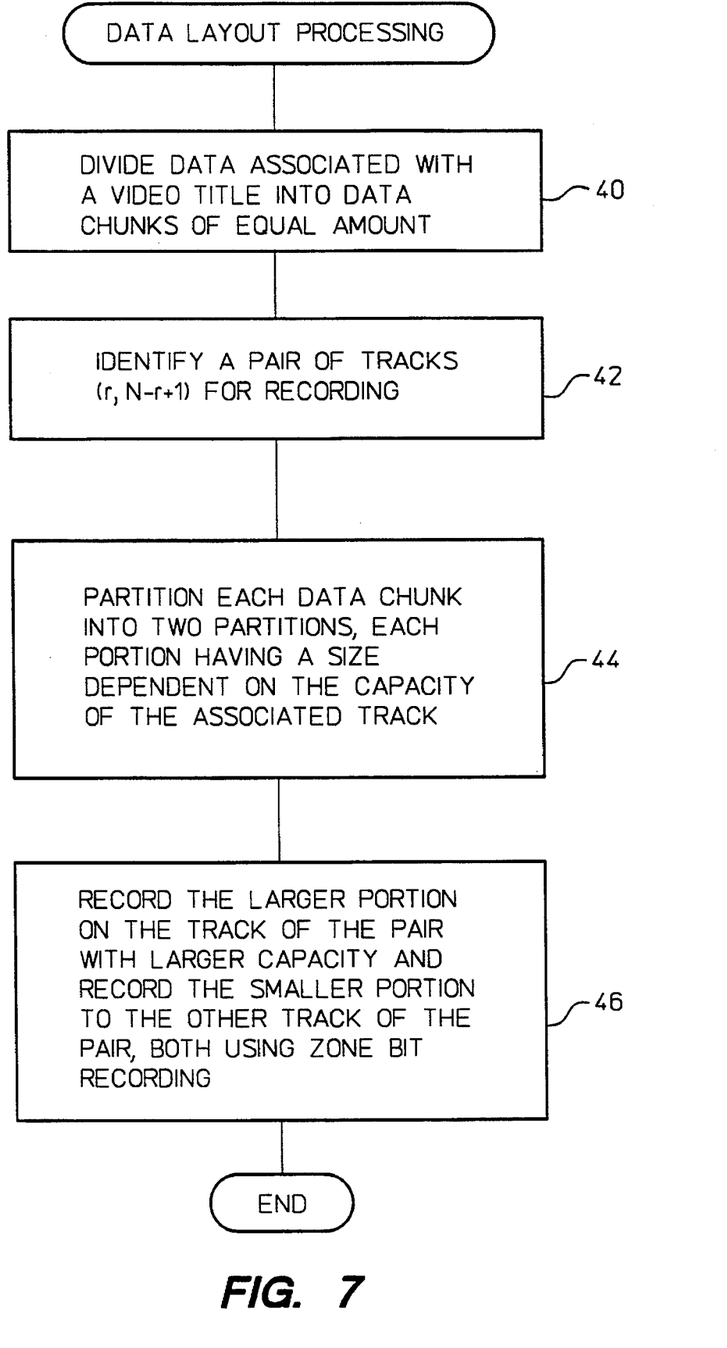
FIGS. 7 and 8 are flow charts illustrating data layout processing and data retrieval processing according to a first embodiment of a method according to the invention.
Figure 8:
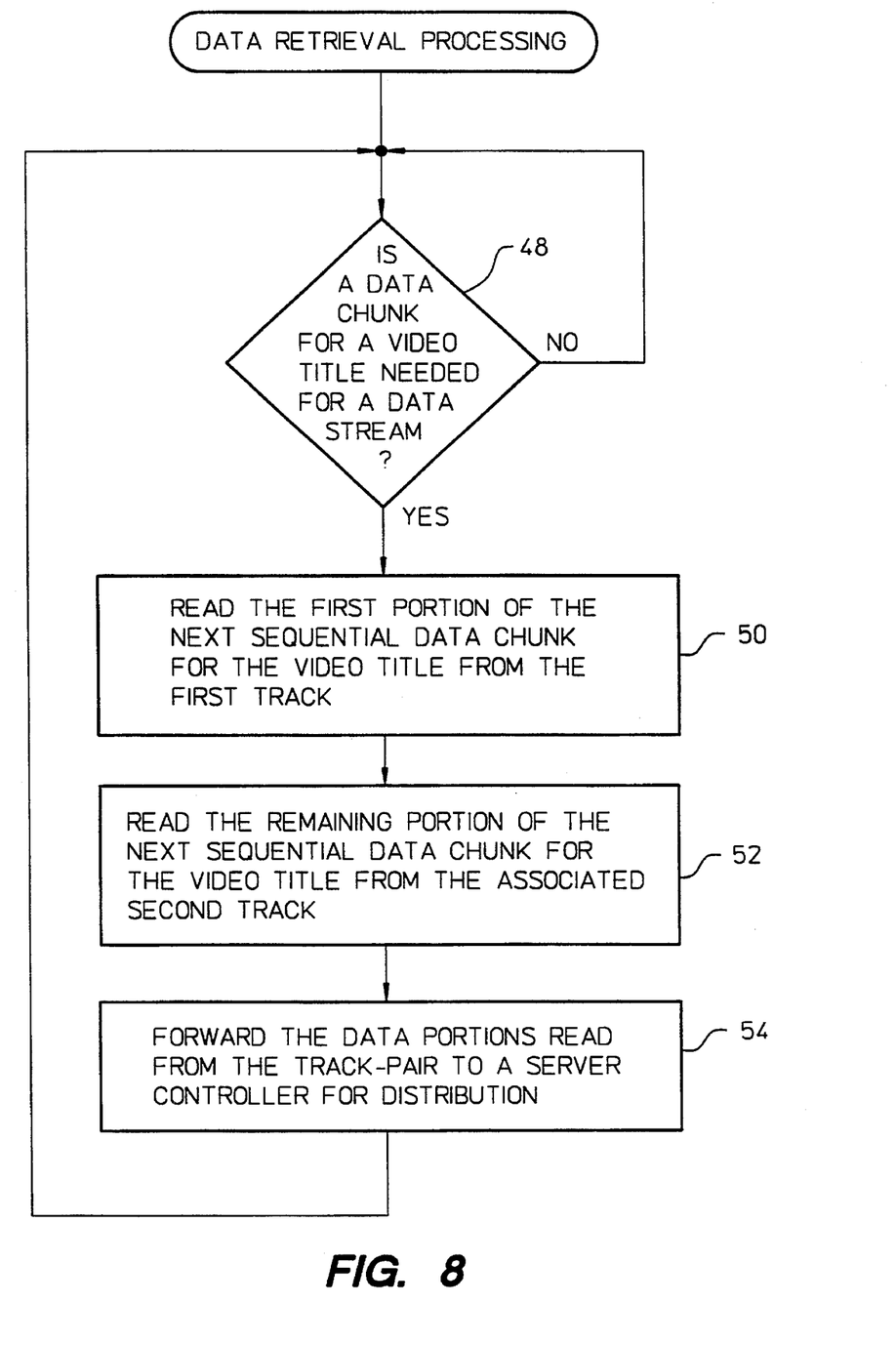

A more specific embodiment of the method according to the invention is discussed below with reference to FIGS. 7 and 8. In this embodiment, data chunks, which are of equal size and which make up a video stream for a given video title are stored and retrieved as two separate and unequal parts, each part being retrieved at a different transfer rate but in the same amount of time.

The data layout process (FIG. 7) for the specific embodiment begins by dividing 40 data associated with a video title into data chunks of equal amount or size. Next, a pair of tracks are identified 42. In general, as shown in FIG. 2, the paired tracks are (r, N−r+1). Once the pair of tracks are identified 42, the data chunks are partitioned 44 into two portions, each portion having a size dependent on the capacity of the associated track. In other words, the data chunks are partitioned 44 between the two tracks according to the ratio of their capacities. For example, if the last portion of data prior to this chunk was stored in an inner track of a track pair, the current chunk will be partitioned such that the larger of the two pieces is the first one to be viewed, and vice versa. Finally, the two portions of the data chunks are recorded 46 on the pair of tracks. The larger portion is recorded 46 on the outer track (larger capacity) of the pair and the smaller portion is recorded 46 on the inner track (smaller capacity) of the pair. The recording, of course, makes use of zone bit recording.

The data retrieval processing (FIG. 8) for the specific embodiment begins by a decision 48. This decision 48 is the same as the decision 34 in FIG. 6, except that the unit of data is a data chunk which are equally sized pieces of video data from a data stream. In contrast, the data segments in FIG. 6 can be either a complete data chunk or some portion thereof. In any case, if a data chunk is needed for the data stream, the processing continues as follows. The first portion of the next sequential data chunk for the video title is read 50 from the first track. Thereafter, the remaining portion of the next sequential data chunk of the video title is read 52 from the second track. The remaining portion need not be read immediately after reading the first portion. Finally, the data retrieval process is completed by forwarding 54 the data portions read 50, 52 from the track-pair to a server controller for distribution to customers or the like who desire to view the video title.

Although most of the above discussion was with reference to a single data stream, a storage server is normally required to support may data streams simultaneously. Hence, data segments are retrieved for each of a plurality of data streams every schedule round. The invention allows the storage server to offer the data streams better performance guarantees which means better service can be offered. Further, the invention enables the storage server to support a greater number of simultaneous streams.

While track-pairing is on a track-by-track basis, the chunk sizes may be larger or smaller than a single track. The data to be written, which is of a known size, would be allocated a range of contiguous pairs of tracks that jointly occupy two contiguous sets of tracks on the drive such that the sum of the capacities of these tracks equals the size of the data. The data would be written by alternating between these two contiguous regions. For example, the data could be written to the disk beginning from the outermost track of the outermost region and beginning from the innermost track of the innermost region and proceeding in contiguous locations. Hence, the invention also applies to a set of pairs of contiguous regions wherein the tracks in each pair of contiguous regions are paired. The paired contiguous regions will have the same number of tracks.

Further, although several the above described embodiments refer to magnetic disk drives or magnetic storage, the invention is broadly applicable to any recording device with similar mechanical characteristics and data layout, namely fixed rpm and essentially fixed linear recording density. Examples of such additional recording devices are optical disks, magneto-optical and WORM (write once - read many).

Hybrid operation can also be obtained. Contiguous regions containing the innermost and/or outermost tracks of a disk drive could be allocated for special purposes and the remaining tracks could be track-paired. The video title at the outermost track would enjoy optimized performance which would be useful for a popular new release movie, while the video title at the innermost track could be used for a low demand movie. The tracks in between would be optimized as a group using track pairing, with data transfer rate being independent of track location.

Generally, any tracks in a contiguous set of tracks may be excluded from pairing, with the remaining tracks paired. A generalized method for excluding certain tracks from the pairing would include the steps of: excluding a contiguous region including an arbitrary number of tracks beginning with the innermost and/or the outermost track; pairing the remaining tracks as if they constituted the entire disk; removing an arbitrary subset of track pairs from the pairing; and thereafter using the remaining pairs as described above.

The many features and advantages of the present invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

I claim:

1. A video storage server system capable of being coupled to a communications network, comprising:

at least one disk drive for storing video data for a plurality of video titles in a zone bit recording format, the video data for each of the video titles includes successive data segments that are alternately recorded in two different tracks, and a controller for controlling transmission of certain video data onto the communication network such that when the data segments are alternately retrieved from the different tracks a nearly constant data transfer rate results regardless of track position, wherein the two different tracks form a track pair, wherein said at least one disk drive comprises at least one recording disk, and wherein when a first track of the track pair is TR1, then a second track of the track pair is TR2=N−TR1+1, where N is the number of tracks of the recording disk that are being paired.

2. A video storage server system as recited in claim 1, wherein said video storage server comprises a plurality of disk drives, and wherein the two different tracks having the successive data segments alternately recorded thereon are on the same or different disk drives.

3. A video storage server as recited in claim 1, wherein said disk drive is a magnetic disk drive, and said recording disk is a magnetic disk.

4. A method for storing a stream of video data to a storage system so as to obtain a nearly constant data storage transfer rate when reading the video data from the storage system, comprising:

(a) partitioning data associated with a certain video title into data segments;

(b) identifying two different tracks of the storage system to store the data segments of the certain video title; and (c) recording the data segments to the two different tracks of the storage system using zone bit recording by alternating between the two different tracks, wherein if a first track of the two different tracks is TR1, the second of the tracks is TR2=N−TR1+1, where the tracks being paired are numbered 1, 2, . . . , N, and N is the total number of tracks being paired.

5. A method as recited in claim 4, wherein said method further comprises (d) reading the data segments alternately from the two different tracks to reformulate the stream of video data.

6. A method as recited in claim 5, wherein the two different tracks are associated with one another as a pair, and the average of a disk transfer rate for a data segment read from each of the two different tracks is substantially constant regardless of track position.

7. A method as recited in claim 4, wherein the storage system comprises at least one magnetic disk drive.

8. A method as recited in claim 4, wherein the storage system comprises a plurality of disk drives, and wherein the two different tracks are on different disk drives, and the data segments of the stream of video data are striped across the plurality of disk drives using the two different tracks on the different disk drives, respectively.

9. A method as recited in claim 4, wherein the storage system is within a video storage server.

10. A method as recited in claim 4, wherein the data segments correspond to individual schedule rounds for a data stream.

11. A method as recited in claim 10, wherein said recording (c) records a first data segment to the first track of the two different tracks, and records a second data segment to the second track of the two different tracks.

12. A method as recited in claim 1, wherein the data segments correspond to a portion of individual schedule rounds for a data stream, and the portion of the individual schedule rounds varies with the track position where the portion is to be recorded.

13. A method as recited in claim 12, wherein said recording (c) records a first data segment to the first track of the two different tracks, and records a second data segment to the second track of the two different tracks 14. A method for storing data on a recording disk so as to obtain a near constant data transfer rate when reading the data from the recording disk, comprising:

(a) dividing the data associated with a certain video title into data chunks of equal amounts;

(b) identifying a pair of tracks for recording the data chunks:

(c) partitioning each data chunk into two portions according to the ratio of the recording capacities of the tracks in the pair of tracks:

(d) recording the two portions of the data chunk to respective tracks of the pair of tracks using zone bit recording; and (e) thereafter reading the two portions of each data chunk from the tracks of the pair of tracks, wherein said reading of the portions of each data chunk from the tracks as a pair results in a nearly constant data transfer rate for the data chunk regardless of track position, wherein the pair of tracks includes first and second tracks, each of which has a track position, and the track position of the first track is r, wherein when said identifying (b) determines the track position of the second track as N−r+1, where the tracks being paired are numbered 1, 2, . . . , N, and N is the total number of tracks being paired.

15. A method as recited in claim 14, wherein said recording disk is a magnetic recording disk, and wherein said recording records a larger portion of the two portions to an outer track of the pair of tracks and records a smaller portion of the two portions to an inner track of the pair of tracks.

16. A method for recording data on and retrieving the data from any fraction of one or more disk drives formatted for zone bit recording and rotating at a fixed number of revolutions per second, said method comprising:

(a) selecting an inner set of consecutive tracks of a disk;

(b) selecting an outer set of consecutive tracks of a disk, the outer set of consecutive tracks being non-overlapping with the inner set of consecutive tracks and containing an equal number of consecutive tracks;

(c) partitioning a chunk of data into a first portion and a second portion, said partitioning being performed based on the relative capacity of one or more tracks from each of the outer and inner sets of tracks:

(d) recording the first portion of the chunk of data onto one or more tracks of the outer set of consecutive tracks;

(e) recording the second portion of the chunk of data onto one or more tracks of the inner set of consecutive tracks; and (f) reading the first and second portions of the chunk of data in the same sequence as they were recorded, wherein said recording and reading attains an effective data transfer rate which is independent of location of the data being retrieved from or recorded to the one or more disks, wherein prior to said recording (d) and (e), said method comprises:

(g) identifying a sufficiently large vacant region on the one or more disks that comprises angular spans, one in the outer and the other in the inner set of tracks, the angular spans being equal, and each of the angular spans being a span from a starting angular position to an ending angular position; and (h) computing a minimum angular span size such that the sum of the number of sectors contained in the respective spans of the minimum angular span size in the outer and inner sets of consecutive tracks would be equal to the size of the chunk of data being recorded, and wherein said recording (d) records one of the first and second portions of the chunk of data onto consecutive sectors in the corresponding span of the outer set of consecutive tracks, and said recording (e) records the other portion of the chunk of data onto consecutive sectors in the corresponding span of the inner set of consecutive tracks.

17. A method as recited in claim 16, wherein the data to be recorded or retrieved are streams of data, and wherein said reading is capable of concurrently sourcing the same number of the streams of data regardless of location of the data comprising the streams on the one or more disks.

18. A method as recited in 16, wherein the number of the streams said reading can concurrently source is the maximum number of streams that can definitely be sourced without prior knowledge of the identity of the data that will be requested.

19. A method as recited in claim 16, wherein the inner set of consecutive tracks and the outer set of consecutive tracks are on different disk drives.

20. A method as recited in claim 16, wherein the inner set of consecutive tracks and the outer set of consecutive tracks are on the same disk drive.

* * * * *